(No Model.)
L. FINDLEY.
PULVERIZER.
No. 342,593. Patented May 25, 1886.
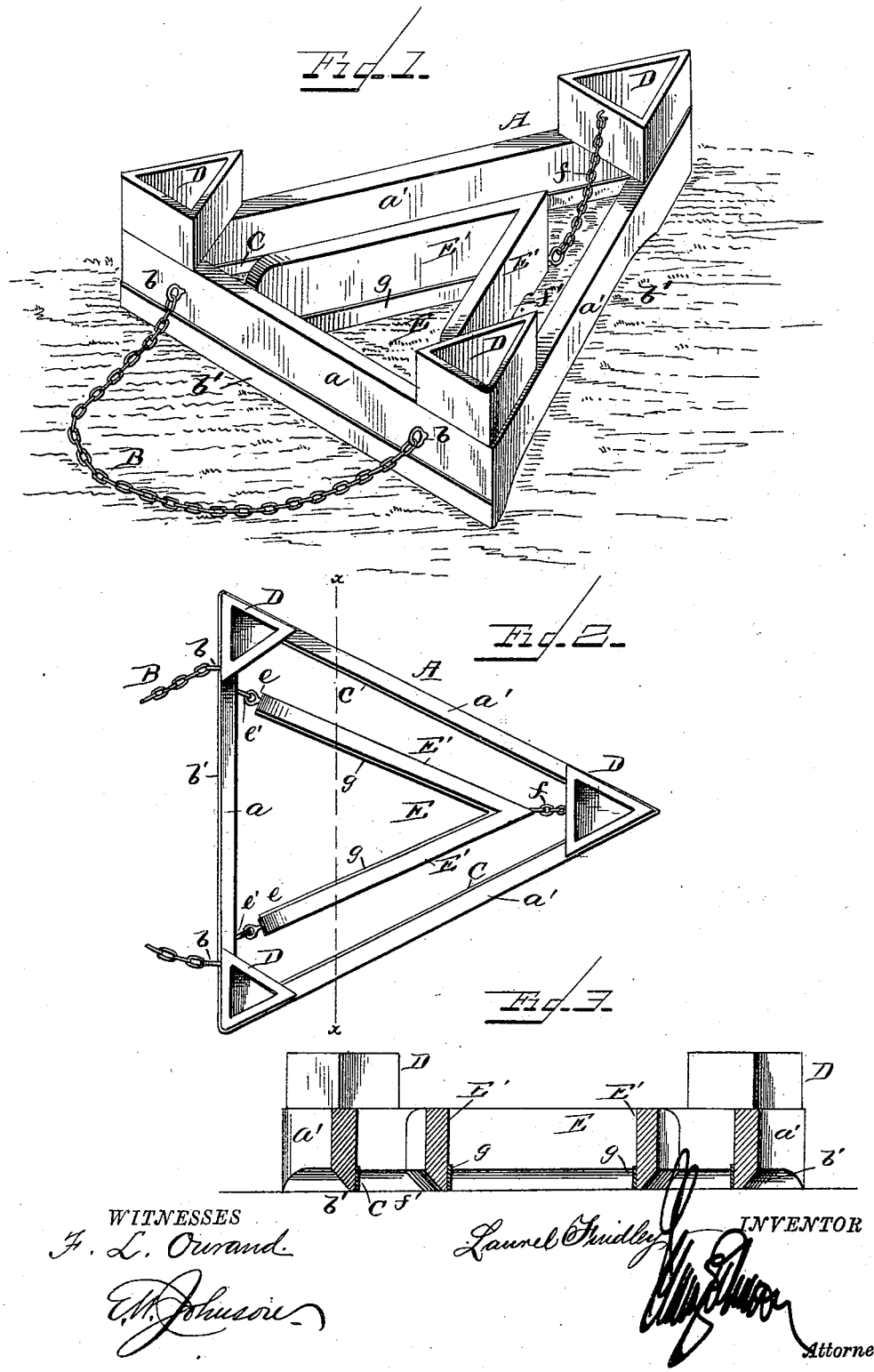
WITNESSES
F. L. Ourand
E. W. Johnson
INVENTOR
Laurel Findley
Attorney

UNITED STATES PATENT OFFICE.

LAUREL FINDLEY, OF HOMER, MICHIGAN.

PULVERIZER.

SPECIFICATION forming part of Letters Patent No. 342,593, dated May 25, 1886.

Application filed November 25, 1885. Serial No. 183,955. (No model.)

*To all whom it may concern:*

Be it known that I, LAUREL FINDLEY, a citizen of the United States of America, residing at Homer, in the county of Calhoun and State of Michigan, have invented certain new and useful Improvements in Pulverizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in land-drags or earth-pulverizers; and it consists in providing a drag with an outer triangular frame, which is provided at its corners with boxes for the reception of weights and in securing within said frame a V-shaped frame, which is freely moved vertically therein, as will be hereinafter fully set forth and specifically pointed out in the claim.

In the accompanying drawings, which illustrate my invention, Figure 1 is a perspective view of a pulverizer or drag constructed in accordance with my improvement. Fig. 2 is a plan view, and Fig. 3 is a sectional view taken through the line $x$ $x$ of Fig. 2.

A represents a rigid triangular frame, which is provided at its front side, $a$, with eyes $b$, to which are secured a draft-chain, B. The side pieces of the frame A, indicated by $a'$, are beveled at their outer edges, as shown at $b'$, and to their inner sides are attached metallic strips C. The beam $a$ is also beveled on its inner side, and a strip, $b'$, is attached to the outer side. The corners of this rigid frame A are each provided with triangular-shaped boxes D, which are intended for the reception of weights, in order to cause the frame A to enter more deeply into the ground.

E refers to a V-shaped frame, the side pieces, E', of which are rigidly connected to each other, while the opposite ends are provided with eyes $e$, which engage with other eyes, $e'$, which are secured to the inner side of the cross-bar $a$ of the frame A, thus allowing the V-shaped section to move pivotally upon the rigid frame. The rear end or point of the V-shaped section E is connected by a chain or flexible connection, $f$, to the box D, said chain limiting the pivotal movement of said section. The outer sides of these pieces E' of the frame E are cut away or beveled, as shown at $f'$, and said section is provided at its lower edges with metallic strips $g$, which are rigidly attached thereto. It will be seen by this construction that the implement when drawn over the ground will smooth the same, and that the metallic strips will protect the framework from undue wear, and that as the rear edges of the beams of the frames are beveled the earth, after being smoothed, can freely pass under the same. It will be also noticed that the inequalities of the ground which are not removed by the front beam will be leveled by the pivoted section, which is attached thereto.

The weights in the boxes may be varied, so as to cause the drag to enter the ground to a greater or less extent.

I claim—

A drag or pulverizer consisting of a rigid triangular frame having the lower edges beveled, and provided with metallic strips $b'$, said frame carrying at its corners boxes for the reception of weights, and provided centrally with a V-shaped frame, which is pivotally attached to the front end of the outer frame, the lower edges of said pivoted frame being beveled and provided with strips, substantially as shown, and for the purpose set forth.

In testimony whereof I affix my signature in presence of two witnesses.

LAUREL FINDLEY.

Witnesses:
GEO. H. FRENCH,
JOHN D. TILLOTSON.